United States Patent Office 3,042,519
Patented July 3, 1962

3,042,519
LATENT IMAGE PHOTOGRAPHIC SYSTEM

Eugene Wainer, Cleveland Heights, Ohio, assignor to Horizons Incorporated, Cleveland, Ohio, a corporation of New Jersey No Drawing. Filed Jan. 8, 1960, Ser. No. 1,162
10 Claims. (Cl. 96—48)

This invention relates to compositions which are sensitive to light and suitable for photography and photographic reproduction purposes. More particularly, the invention relates to the production of stable, colored, print-out and developable-out image produced by exposing to light and/or to light and heat, photosensitive compositions comprising a dispersion of N-vinyl compounds mixed with a source of free radicals such as certain halogen organic compounds, and dispersed in specific paraffinic hydrocarbon compounds alone or in combination with a synthetic resin base.

Objects of this invention are to effect a reaction involving an N-vinyl compound in a system containing an organic halogen compound which releases free radicals under the influence of light of suitable wavelengths and containing hydrocarbon compounds with or without a synthetic resin base, wherein the components are disposed so that under the influence of ultraviolet or visible light a color form is produced as the result of the foregoing reaction; to develop this color forming reaction solely through use of exposure to ultraviolet light or visible light for a time sufficient that a colored image of high contrast is obtained; to provide systems which on exceptionally short exposure to either ultraviolet or visible light will produce a substantially non-visible latent image which without affecting the non-light struck areas is subsequently made visible by heating or by treatment with infrared; to produce a negative-positive result by first exposing through a negative to a source of ultraviolet light and subsequently developing by heat; to produce a positive-positive image by first giving an extremely brief exposure through a negative or other image source to short wavelength ultraviolet, followed by exposure to long wave ultraviolet light or visible light, with or without the necessity for subsequent heating in order to fully develop the portions which have been struck with a long wavelength light; to provide systems in the exposure, development, and fixing stages which may be processed by totally dry techniques; to provide means for stabilization of both pre-exposed and exposed surfaces so that the desired color reactions take place only on exposure to light of various wavelengths or exposure to heat or to combination of both; to provide photographic systems of high quantum yields leading to high photographic speeds of a controllable nature; to provide a means whereby a free radical polymerization reaction eventually leading to the production of a color may proceed extensively without premature stoppage of the growing chains of color producing monomer; and finally, to produce these systems so they may be used on a practical basis from the standpoint of storage, handling, and the like.

In other copending applications, Serial Numbers 787,112, filed January 16, 1959; 841,459, filed September 22, 1959; 841,460 filed September 22, 1959; and 842,569, filed September 28, 1959, I have described photosensitive systems utilizing various combinations of arylamines, organic and inorganic halogenating agents, minor amounts of phenol derivatives, minor amounts of sensitizers to the visible comprised chiefly of azo-aniline compounds, minor amounts of materials which improve the absorption of light in the ultraviolet, sulfur compound, and the like dispersed in a resinous film base. The majority of these are print-out processes in which the color or image is obtained directly as the result of exposure to light with or without the necessity for further treatment, such as heating. The majority are negative-positive processes, though in certain special cases, these may be made into positive-positive techniques.

In the copending applications referred to, certain of the sensitive ingredients in these already described compositions appear to have undergone chemical transformation as the result of the various exposure conditions in which molecules considerably larger than those represented by the starting agents were prepared. As a result, quantum yields, in a photographic sense, in excess of one were achieved. These larger molecules produced as the result of exposure to light may have been larger structures differing substantially in chemistry from any one of the original starting materials but, to a certain extent, it was also possible that a limited degree of actual chain type polymerization had taken place.

One of the already known techniques of polymerization using thermal methods presently utilized is to place a monomer in a suitable solvent, add to the solvent a chemical which can decompose thermally to produce free radicals, and such free radicals are then available for initiating the steady polymerization of the monomer in such a solvent at these elevated temperatures. In order for the entire system to work effectively to produce high molecular weight compounds, it is a requirement that the so-called "chain transfer reactions" either be inhibited completely or be minimized to a large extent. This simply means that a reaction which permits the propagating mechanisms to combine with the solvent rather than with the growing polymer chain will represent a stopping mechanism for the polymerization process.

Invariably, however, such thermal polymerizations take place readily only in the liquid state, and if the solvent has been omitted, generally, the lability required for the polymerization to proceed properly is not present and little or no polymerization is evident. In view of the limited number of materials which will form free radicals as a result of exposure to light, the situation is rendered even more difficult if an attempt is made to use such systems for photographic purposes.

Briefly in accordance with the present invention, I have found that a free radical type of polymerization of monomer can be initiated in systems of suitable composition by exposure to light of specific wavelengths, and further that such a free radical polymerization can be hindered or stopped entirely by exposure to light of other wavelengths or by heating, or by a combination of both. Further, it has been found that such free radical polymerizations can be carried out in the solid or substantially solid state to yield not only a large degree of polymerization, but at the same time the nature of the compounds formed in the menstruum devised for permitting such a free radical polymerization to develop are such that either through the application of light or a combination of light and heat, a color derivative is achieved from a previously transparent, colorless solid composition. The reaction appears to be a polymerization process taking place prior to the formation of the colored derivative, and in a photographic sense the reaction takes place with a high overall quantum yield, thus producing high photographic speed in the system. Although I am not certain of the exact mechanism of development of the polymerization and the color forming reactions, it appears that, as the result of an initial photopolymerization, long chains are produced, and as a result of subsequent treatment, generally involving heat, grafting on the bank of these long chains takes place which results in the production of a color. In a free radical type of polymerization involving the formation of chains, these may involve the preparation of a large number of molecules of relatively low molecular weight or the formation of a relatively small number of molecules of a very large molecular weight.

As the result of the ability to obtain sharp images, high degree of resolution, high photographic speed and facility for producing negatives or direct positives by virtue of the manner in which these photosensitive surfaces are handled, these photosensitive systems find utility in the field of industrial, professional, and certain aspects of amateur photography and photographic reproduction with the advantages of economy, simplicity, and dry processing. Such systems, therefore, can be used in such areas of photographic utility as the office photocopy field, the preparation of copies of engineering drawings and technical data, the reproduction of typed and printed pages or images obtained by transmission through microfilm, the direct recording of transient events from the face of a cathode ray tube, the preparation of slides for projection purposes, and the taking of pictures in a camera. As indicated, the process may be modified so that it may be either negative-positive or positive-positive if desired.

More specifically, I have found that if an N-vinyl compound is mixed with a suitable source of halogen free radicals and this system is then dispersed in solid hydrocarbons which are relatively free of cyclic constituents, that not only is a high degree of polymerization developed as a result of exposure to light resulting in a high overall quantum yield, but in many cases heating or simply standing in the dark permits the formation of a colored modification, the degree of color obtained being comparable to the degree of polymerization available from the initial light induced reaction.

Even though these overall photosensitive systems are available as solids, and preferably as thin solid films, as the result of the various treatments to which they are exposed involving light or heat or combinations of the two, the reactions take place in such a manner as to indicate that a high degree of photopolymerization has resulted. The nature of the reaction producing a color is not known. In some cases, deep blacks, brown-blacks, or blue-blacks are formed and in other cases, an insoluble phase is produced yielding a white opacity on reflected light, such white opacity appearing black on transmitted light.

I have found that compositions comprising N-vinyl compounds and organic halogen compounds which will decompose under the influence of exposure to light to produce halogen free radicals, and saturated hydrocarbons of the normal and iso-paraffin type represent solid phase systems which, on exposure to light, produce either a color or an opacity directly as the result of exposure to such light or which develop such color or opacity on subsequent heating. The photographic speed is such that the times of exposure may be measured in milliseconds or fractions of milliseconds with illumination comparable to that utilized in indoor photography, or in milliseconds to fractions of milliseconds on exposure to noon-day sunlight, or in milliseconds on exposure to ultraviolet lamps of relatively low wattage, these including lamps utilized in the home for sunbath treatments.

The color or opacity producing reactions may be obtained initially by exposure of my photosensitive system to light in the 3500 to 4500 A. range. Those portions of the sensitive material which have been exposed to light will develop a color or opacity directly or will produce a latent image which subsequently will produce a color or opacity by heating the film either in an oven or with an infrared lamp. In this method of processing, the sensitive surfaces are designated as negative to positive.

If, on the other hand, I expose the same type of sensitive surface through a suitable negative or to a source of light of wavelength between 2200 and 2600 A., a totally different reaction takes place initially. In this case, the portions that are struck by light become noticeably whiter and more opaque than originally present in the unexposed film. The entire film area without the intervention of a negative is now exposed to light in the range of 3500 to 4500 A., and further developed and fixed through application of heat. Under these conditions, the areas exposed to the longer wavelength ultraviolet light will produce dark colors whereas the areas originally exposed to the shorter wavelength of the light are unaffected completely with the end result that a direct positive reading film is available. Such a film after such types of exposure is now stable to further exposures of any combination of light and heat, and thus may be considered to be permanently fixed as the result of the duplex exposure process. In those cases where only the long wavelength ultraviolet light has been utilized, maintenance of the film after exposure in the dark and exposure to moist air for 10 to 12 hours involves permanent fixing. Dim light which does not have any high proportion of ultraviolet light is also effective if moist air is present.

The types of light sources which I have to be effective for the purposes of my invention may be taken from a number of readily available industrial low cost bulbs. For example, the near ultraviolet exposure can be accomplished readily with photofloods of the reflector type in the 100 to 500 watt range. These are standard tungsten filament lamps of relatively short life as the result of the deliberate overloading of the filament in order to achieve extra light output from such a filament. They have no special devices included in their structure in order to produce luminous vapor which might be a source of ultraviolet light. An excellent light source for the near ultraviolet (3500 A. to 4500 A.) is the reflector type sunlamps of the 275 watt variety. Three to five percent of the light output of such a type lamp is in the mid-range of the most active actinic range of light for the compositions of my invention. They are generally used for suntanning treatments. Ordinary mercury lamps are also effective if they operate behind a glass envelope. Flash lamps used by the amateur such as the 50 to 150 watt second xenon type flashlamps may be utilized, in that the spectral distribution of the light put out by such lamps is comparable to that available from the noon-day sun. Sunlight is also useful for the purpose. When the far ultraviolet is used, in the region of 2200 to 2600 A., mercury lamps with a quartz envelope are effective and a most economical lamp is the mercury vapor lamps of tubular form comparable to the construction used in fluorescent lamps, but without the fluorescent coating and utilizing a quartz envelope. These are generally designated as germicidal lamps and a very large proportion of their light output is in the 2500 A., range.

Specific N-vinyl compounds suitable for the purpose of my invention are the N-vinylamines, the N-vinylamides and the N-vinylimides listed in Table 1.

TABLE 1

N-vinylcarbazole
N-vinylphenyl-alpha-naphthylamine
N-vinyldiphenylamine (stabilized with 0.1% NaOH)
N-vinylindole
N-vinylpyrrole
N-vinylpyrrolidone
N-vinylsuccinimide
N-vinylacetanilide
N-vinylphenylacetamide
N-vinylmethylacetamide
N-vinyldiglycolylimide The colors and effects which are obtained as a result of placing these N-vinyl compounds in the overall composition to be described later will vary to a large extent with the particular material being utilized. For example, generally N-vinylcarbazole produces black, brown-black, or blue-black images depending on the length of exposure and the time of heating. N-vinylindole produces reddish or reddish-brown images. N-vinylpyrrolidone generally produces a white opacity which is black in transmitted light. N-vinyldiphenylamine generally produces blues and N-vinylphenyl-alpha-naphthylamine produces greens. These colors and color variations will also vary somewhat with respect to the nature of the hydrocarbon system in which they are placed.

Whether a latent image is formed or a direct color is produced depends to some extent on both the nature of the N-vinyl compound used and the type of base in which said compound is dispersed. On extremely short exposures, particularly in the blue visible, N-vinylcarbazole produces a blue-black image on subsequent heating. If the exposure is in the near ultraviolet, the image tends to be brown-black. If the composition is used directly as a print-out using the near ultraviolet or the blue visible as the exciting light, then the image is a deep blue color. Use of mixtures of these N-vinyl compounds produces complex effects with respect to color. All of these N-vinyl compounds which produce a color exhibit the dual reaction of being able to undergo one type of reaction at a wavelength of 2200 to 2500 A., as described previously, and a different type of reaction at a wavelength between 3500 and 4500 A.

Organic halogen compounds which are suitable for the purposes of my invention include: carbon tetrabromide, tetrabromobutane, hexachloroethane, tetrachlorotetrahydronaphthalene, iodoform, hexachlorbenzene, dichlorobenzene, and the like. Of these, the compounds carbon tetrabromide, iodoform, and tetrachlorotetrahydronaphthalene are preferred.

Each of these it will be noted is a halogenated hydrocarbon in which the active halogen atom is attached to a carbon to which there is attached not more than a single hydrogen atom and it will be further noted that as described in my application Serial No. 787,112, filed January 16, 1959, the activation energy of the halogen free-radical is the important determining factor in the suitability of the halogenated hydrocarbon for the present process.

It appears that in order for the halogenated hydrocarbon to be effective in the present process it must have an energy of dissociation or in other words an energy of formation of the free halogen radical of not less than 40 kilogram calories per mole. Each of the halogen compounds indicated above as suitable, it will be noted, is a halogenated hydrocarbon in which at least one active halogen (Cl, Br or I) is attached to a carbon atom having not more than one hydrogen atom attached thereto.

The hydrocarbons which are utilized in my invention as the menstruum or backbone for the polymerization are the saturated straight chain or branched chain type generally designated as paraffin or iso-paraffin hydrocarbons, and have the general formula $C_nH_{2n+2}$, wherein $n$ ranges from about 10 up to about 70.

Commercially, and depending on melting point, these hydrocarbons are generally designated as waxes such as paraffin, petrolatum, and microcrystalline. The paraffin type waxes are generally lower in molecular weight and melting point than the microcrystalline waxes. The waxes suitable for the purposes of my invention are the fully refined, white varieties generally prepared by fractional distillation, treatment in the liquid state with absorbents to remove coloring agents, and finally separated into various cuts of melting point and molecular weight by distillation. Solvent extraction followed by centrifuging or filtration is also used for purification separation of these waxes.

The waxes are utilized in these formulations in several different ways. Certain of these exhibit properties such that they may be used essentially as single compounds without further admixture, as a result of their molecular weight and melting point. A wax of this type is eicosane having 20 carbon atoms in its structure. The higher molecular weight waxes may be also used alone, but they are advantageously mixed with proportions of waxes exhibiting molecular weights less than that equivalent to eicosane and the higher the molecular weight, the greater the proportion of the lower molecular weight admixture. For example, a wax commercially designated as FT–300 made by the Fischer-Tropsch technique having a melting point between 102 and 105° C. and containing roughly 66 carbon atoms in its structure may be mixed with approximately equal proportions of tetradecane having a melting point of 5.5° C. and containing 14 carbon atoms in its structure. Petroleum oils are generally hydrocarbons containing less than 14 carbon atoms in their structure, and such hydrocarbons are again of the paraffin or iso-paraffin type. Petroleum oils containing between 10 and 14 carbon atoms in straight chain structures may be used as admixtures to the hydrocarbons both as plasticizers and for purposes of photo-acceleration.

As indicated, the waxes used in this invention are taken from the class of the paraffins, the petrolatums, and the microcrystalline waxes. Paraffin waxes will generally have molecular weights in the region of 300 to 400. The microcrystalline waxes will generally have molecular weights in the region of 400 to 900. The petrolatums generally consist of a paraffin wax with a considerable amount of oil which in turn is composed of straight chain hydrocarbons with between 10 carbons and 15 carbons in their structure.

While I may use these wax type straight chain hydrocarbons singly or in mixture as the solid medium in which the reactive N-polyvinylidene and free radical source are dispersed, it is also advantageous to add non-oxygen containing synthetic resins. Synthetic vinylidene resins such as polyethylene, polybutene, and polystyrene are effective for the purpose. In those cases where relatively high content of the more or less oily waxes are utilized, addition of these resins adds stiffening and solidification properties. If these synthetic resins in fully polymerized form are utilized, they should exhibit molecular weights of at least 15,000 and preferably in the region of 30,000 to 100,000 for greatest effectiveness.

The waxes may be supplied to the formulation in the molten condition providing the temperature of fusion does not exceed about 50° C. Under this condition, the synthetic resin, if utilized, is added to the wax, and the wax maintained at the 50° C. temperature until the synthetic resin has completely dissolved. Another technique is to pre-dissolve the synthetic resin in a solvent such as trichloroethylene or toluene and add such a solution to the warm wax. In cases where the melting point of the wax is considerably above 50° C., the wax is advantageously dissolved in chlorinated solvents such as trichloroethylene, carbon tetrachloride, chloroform, and the like or benzene or toluene. In general, the solubility of these waxes in the solvents indicated is substantial at 50° C. Under such cases, the wax solution with or without the admixture of synthetic resin is first made available with or without solvents for maintaining its solution at a temperature not exceeding 50° C. The N-vinyl compound is then added and stirred until completely dissolved, and then the organic halogen compound agent is added to the mixture.

As soon as solution is complete, the material is cast or impregnated on a surface such as glass, paper, cloth, synthetic resin film, and the like and cooled quickly and allowed to stand until the solvent has evaporated. All of the foregoing operations are carried out under a red light. If not formed immediately into a film, the photographic dope material is placed in a brown bottle and allowed to cool in which condition it is stable for an indefinite period. It may thereafter be applied to glass, paper, cloth or other suitable supports either cold or after slight warming.

To give an indication of some of the solubility characteristics of the various waxes which define the means by which these formulations can be used, waxes containing up to about 32 or 33 carbon atoms in their structure can be made in 10% solutions in such solvents as the chlorinated solvents indicated and to a limited extent in benzene or toluene. The solutions are either clear or cloudy, but completely labile at room temperature. When the number of carbon atoms are substantially higher than 33 carbon atoms in the structure, the temperature must be increased in order to obtain the desired solution for producing the composition in question.

The preferred ranges of compositions utilized for the purposes of my invention are given in Table 2.

TABLE 2

*Preferred Composition Ranges of Ingredients*

| Ingredient: | Parts by weight |
|---|---|
| 1. Wax of formula $C_nH_{2n+2}$; n>20 | 10 to 100 |
| 2. Wax of formula $C_{20}H_{42}$[1] | 100 |
| 3. Hydrocarbons between $C_{10}$ and $C_{14}$ (optional) | 0 to 25 |
| 4. Hydrocarbon type oxygen free resins (optional) | 0 to 50 |
| 5. Solvent for waxes (optional) | 0 to 1000 |
| 6. Vinyl compound | 10 to 100 |
| 7. Halogen-containing free radical sources | 5 to 200 |

[1] Or equivalent mixture of higher carbon and lower carbon waxes, e.g. wax $C_{14}H_{30}$ 50 parts+wax $C_{70}H_{142}$ 50 parts or wax $C_{14}H_{30}$ 20 parts+$C_{40}H_{82}$ 80 parts.

Having described my invention, the following examples are indicative of methods of practicing same.

*Example 1.*—A 10% solution of a microcrystalline wax was prepared by dissolving the wax in trichlorethylene at 40° C. A clear solution was obtained. The wax used was the commercial variety designated as a microcrystalline wax having a melting range between 170 and 175° F. and is primarily equivalent to the compound pentatriacontane. Similarly, a 10% solution of a paraffin wax having a melting point of approximately 52° C. and equivalent in formula to the compound tetracosane containing 24 carbon atoms in its structure was prepared by dissolving such a wax in toluene. A clear solution was obtained at room temperature. A mixture was then prepared of equal proportions from the above two separate waxes made up of 5 cc. of each solution. Under a red safelight, 0.5 gram of N-vinylcarbazole was added and stirred until dissolved, followed by the addition of 0.5 gram of carbon tetrabromide which was also stirred until it was fully dissolved. The slightly warm solution was then spread on a glass plate with a 10 mil doctor knife and allowed to dry in the dark until non-tacky to the touch. A number of such plates were prepared.

One of these films was then exposed for 0.01 second to the light of a 275 watt reflector type sunlamp with a glass envelope at a distance of 20 inches. Immediately after this exposure to light in the near ultraviolet range, no visible image was seen under the red safelight. The specimen was placed in the dark for about one hour, after which the ultraviolet exposed portion was evident as a deep blue color. The film was then placed under a 250 watt reflector type infrared lamp at a distance of 10 inches for a space of about 10 seconds and the blue color changed to a blue-black color with no visible change in color in the previously unexposed (ultraviolet) portions.

Another of these films was exposed to ultraviolet light as before and then immediately placed under the infrared lamp for about 10 seconds. No visible image was observed. On exposure to the infrared lamp, a deep brown black image developed out in the ultraviolet exposed areas.

A third of these films was exposed through a negative to the light (2200 A. to 2500 A.) from a quartz germicidal lamp for a period of 0.5 second. Immediately after such exposure, the negative was removed and it was then reexposed to a blanket exposure of a 275 watt sunlamp at a distance of 20 inches for one second. Under these conditions, the area which had been previously exposed to the short wave ultraviolet remained white and opaque, and a distinct blue color started to develop in the areas exposed to the long wave ultraviolet light. On heating under the ultraviolet sunlamp, the areas exposed to the long wavelength ultraviolet light turned a brown-black color, whereas the short wavelength ultraviolet light exposed areas remained white.

*Example 2.*—Same as in Example 1 except in place of the wax solutions one gram of eicosane was heated to 40° C. in order to liquify the wax. Thereafter, the 0.5 g. N-vinylcarbazole and 0.5 g. carbon tetrabromide were added as in the preceding example and the same general manifestations were obtained as a result of the types of exposures indicated in Example 1.

*Example 3.*—Same as Example 1 except the wax solution was a mixture of a 10% solution hexahexacontane containing 66 carbon atoms in its structure, dissolved in trichlorethylene at 50° C. and a 10% solution of tetradecane equivalent to a hydrocarbon containing 14 carbon atoms in its structure, dissolved in toluene. Five cc. of each of these 10% solutions were utilized to produce a mixture maintained at approximately 44° C. 0.8 gram of N-vinylcarbazole and 0.5 gram of carbon tetrabromide was added to the mixture until completely dissolved. After spreading on a glass plate the film was allowed to dry in the dark. Exposure to long wavelength ultraviolet light followed by a 15 second heating period under the infrared lamp produced a heat developed out brown-black dense image.

*Example 4.*—A solution was prepared consisting of 20 grams of tetradecane and 80 grams of polystyrene dissolved in 900 cc. of trichlorethylene. Under a red safelight, 60 grams of N-vinylpyrollidone was added and dissolved followed by 100 grams of tetrachlortetrahydronaphthalene. After solution was complete, the dope was spread on a glass plate as before and dried in the dark.

Films prepared as above were exposed to the 275 watt sunlamp for 0.01 seconds and then heated under the infrared lamp for 10 seconds further. The ultraviolet exposed portion yields a white opacity after infrared treatment whereas the portions which were not exposed to ultraviolet light remained clear and transparent. When ordinary tungsten light was transmitted through the film, the white opaque area produced a black image indicating that substantially complete light scattering was available from the white opaque precipitate which had formed in the ultraviolet exposed sections.

*Example 5.*—The composition in accordance with Example 1 was prepared except that N-vinyldiphenylamine was used instead of the N-vinylcarbazole. Exposure to the ultraviolet produced a rich blue color which deepened in blue without developing black tones on subsequent treatment with infrared.

*Example 6.*—A mixture of 90 parts of hexahexacontane and 10 parts of petroleum jelly-white, U.S.P., was dissolved in 900 cc. of trichlorethylene at 50° C. Fifty grams of N-vinylcarbazole was added under a red safelight, followed by 10 grams of carbon tetrabromide. The resulting solution was spread as a thin film onto a glass plate and air dried in the dark.

After exposure to the sunlamp for 0.01 second and followed by heat treatment for 15 seconds under the infrared lamp, a pale blue, completely opaque image was obtained, whereas the unexposed portions show a faint opalescence without any substantial amount of color. On viewing this film by transmitted light using a tungsten lamp, the ultraviolet exposed areas appeared black.

*Example 7.*—Fifty grams of pentacosane was dissolved in 50 cc. of trichlorethylene at 50° C. One hundred cc. of toluene was then added, followed by 100 grams of N-vinylcarbazole and 100 grams of carbon tetrabromide, all of the above mixing taking place under a red safelight. The warm mixture was smeared onto a piece of #40 filter paper with a spatula and allowed to dry in the dark until all evidence of solvents had disappeared as coufld be determined by odor. The material was exposed through a negative to a quartz envelope germicidal lamp for 0.1 second. The quartz lamp was then turned off and the negative removed, after which the entire piece of paper was exposed for one second to a 275 watt sunlamp. A blue-black image developed out in the areas which had been previously covered by the opaque portions of the negative. On subsequent heating under the infrared lamp for 15 seconds, a brownish tone developed in the blue-black image. The foregoing is an example of a direct positive reproduction.

*Example 8.*—Five grams of white U.S.P. petroleum jelly, 50 grams of eicosane, and 50 grams of polybutene of molecular weight of approximately 75,000 was dissolved in 900 cc. of toluene at 50° C. Under a red safelight, 70 grams of N-vinylcarbazole was added, followed by 50 grams of iodoform. The foregoing mixture was spread on a glass plate with a 10 mil doctor knife and then exposed to the sunlamp at a distance of 20 inches for 0.1 second. After allowing this film to stand in the dark for about an hour after exposure, a greenish black image was obtained. A similar film was immediately exposed to infrared light directly after an ultraviolet exposure of 0.01 second. In this case, it was clear that the ultraviolet image was a latent one and the infrared exposure produced a greenish brown image in the U.V. exposed portions.

Having now described by invention in accordance with the patent statutes, I claim:

1. A dry photographic film, suitable for the production of visible images by exposure to suitable radiation, comprising at least one solid saturated hydrocarbon selected from the group consisting of straight chain and branched chain hydrocarbons having the general formula $C_nH_{2n+2}$ wherein $n$ ranges from about 10 to about 70 having dispersed therein at least one N-vinyl compound selected from the group consisting of N-vinylamines, N-vinylamides, and N-vinylimides; and a halogenated hydrocarbon compound selected from the group consisting of halogenated hydrocarbon compounds having an energy of formation of a free halogen radical of not less than 40 kilogram calories per mol and in which at least one active halogen selected from the group consisting of chlorine, bromine and iodine is attached to a carbon atom having not more than one hydrogen atom attached thereto.

2. The composition of claim 1 in the form of a thin film supported on a material selected from the group consisting of glass, paper, cloth and synthetic resins.

3. The composition of claim 1 wherein the N-vinyl compound is selected from the group consisting of N-vinylcarbazole, N-vinylphenyl-alpha-naphthylamine, N-vinyldiphenylamine stabilized with 0.1% NaOH, N-vinylindole, N-vinylpyrrole, N-vinylpyrrolidone, N-vinylsuccinimide, N-vinylacetanilide, N-vinylphenylacetamide, N-vinylmethylacetamide, and N-vinyldiglycolylimide.

4. The composition of claim 1 wherein the halogenated hydrocarbon agent is selected from the group consisting of carbon tetrabromide, tetrabrombutane, hexachlorethane, iodoform, hexachlorbenzene, dichlorbenzene, and tetrachlortetrahydronaphthalene.

5. A method of producing an invisible latent image which comprises preparing a mixture of the composition of the photographic film of claim 1 in a solvent for the saturated hydrocarbon therein, spreading the resulting liquid composition as a thin film on a suitable support; drying the film in the dark; and exposing the film to a pattern of ultraviolet light, whereby a latent image is produced which may be rendered visible by exposure to thermal radiation.

6. A method of producing a visible image which comprises preparing a mixture of the composition of claim 1 in a solvent for the saturated hydrocarbon, spreading the composition as a thin film on a suitable support; drying the film in the dark; and exposing the film to a pattern of ultraviolet light, whereby a latent image is produced and exposing the film bearing the latent image to thermal radiation to produce a visible image.

7. A photographic process which comprises preparing the composition of claim 1 in a solvent for the saturated hydrocarbon; spreading the composition as a thin film on a suitable solid support; drying the film in the dark; exposing the film to a pattern of 3500 A. to 4500 A. light and thereafter heating the exposed film to further develop and fix the image thereon.

8. A photographic process which comprises preparing the composition of claim 1 in a solvent for the saturated hydrocarbon; spreading the composition as a thin film on a suitable solid support; drying the film in the dark; exposing the film through a mask, to a pattern of 2200 A. to 2600 A. light; thereafter exposing the entire film to 3500 A. to 4500 A. light; and after said blanket exposure, heating the exposed film, to further develop and fix the image thereon.

9. The composition of claim 1 wherein the base material in which the remaining constituents are dispersed comprises a mixture of (1) saturated hydrocarbon selected from the group consisting of paraffinic and isoparaffinic hydrocarbons having not over 70 carbon atoms and (2) a synthetic resin.

10. The composition of claim 1 wherein said hydrocarbon is a mixture of saturated hydrocarbons comprising up to about 25 parts by weight of $C_{10}$ to $C_{14}$ hydrocarbons and between 10 and 100 parts by weight of $C_{20}$ to $C_{70}$ hydrocarbon for each 100 parts by weight of hydrocarbon wax of the formula $C_{20}H_{42}$ in said mixture.

References Cited in the file of this patent

UNITED STATES PATENTS

| | | |
|---|---|---|
| 1,587,274 | Beebe et al. | June 1, 1926 |
| 2,072,465 | Reppe et al. | Mar. 2, 1937 |
| 2,276,840 | Hanford et al. | Mar. 17, 1942 |
| 2,725,369 | Robinson | Nov. 29, 1955 |
| 2,882,262 | Smith et al. | Apr. 14, 1959 |
| 2,902,365 | Martin | Sept. 1, 1959 |

UNITED STATES PATENT OFFICE

CERTIFICATE OF CORRECTION

Patent No. 3,042,519 July 3, 1962

Eugene Wainer

It is hereby certified that error appears in the above numbered patent requiring correction and that the said Letters Patent should read as corrected below.

Column 1, line 13, for "image" read -- images --; line 70, for "compound" read -- compounds --; column 2, line 69, for "bank" read -- back --; column 6, line 27, for "N-polyvinylidene" read -- N-vinyl compound --; line 29, for "vinylidene" read -- polyvinylidene --; column 7, line 20, for "Vinyl" read -- N-vinyl --; column 9, line 56, strike out "agent".

Signed and sealed this 20th day of November 1962.

(SEAL)
Attest:

ERNEST W. SWIDER
Attesting Officer

DAVID L. LADD
Commissioner of Patents